BAND PASS-BAND REJECT FILTER
Filed Nov. 20, 1957
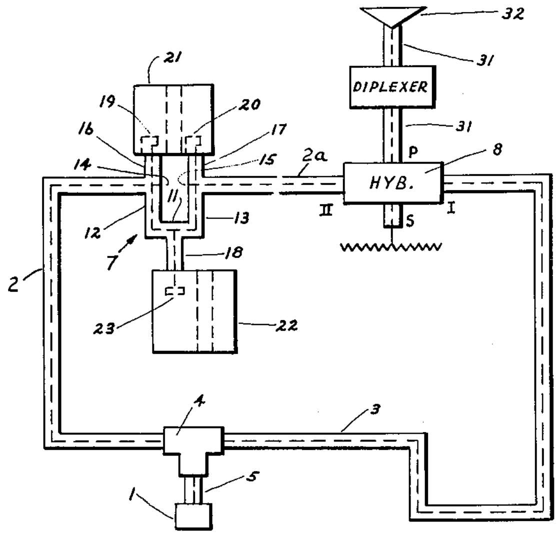
FIG. 1
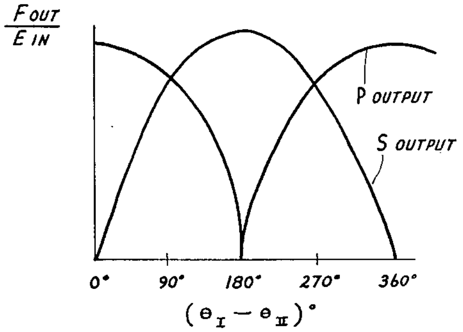
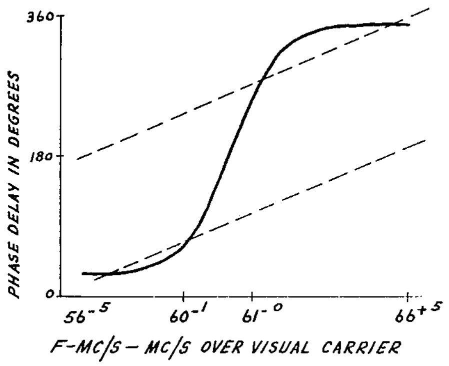
FIG. 3 FIG. 2
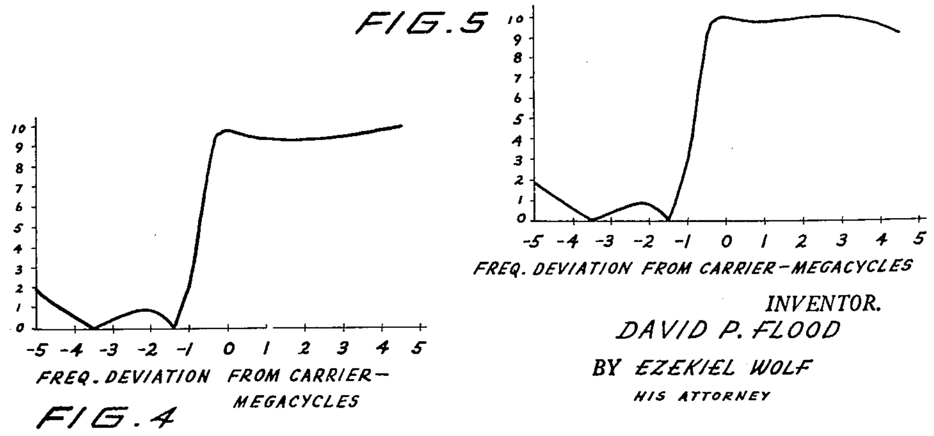
FIG. 5 FIG. 4
INVENTOR.
DAVID P. FLOOD
BY EZEKIEL WOLF
HIS ATTORNEY United States Patent Office 3,056,933

Patented Oct. 2, 1962

3,056,933

BAND PASS-BAND REJECT FILTER

David P. Flood, Natick, Mass. (% Andrew Alford, 299 Atlantic Ave., Boston, Mass.)

Filed Nov. 20, 1957, Ser. No. 697,725
4 Claims. (Cl. 333—73)

The present invention relates to a radio frequency network, particularly adapted for use as a vestigial side band filter principally in V.H.F. and U.H.F. frequency spectrum.

This invention is a modification of my copending application Serial No. 547,606, filed November 18, 1955, for a Radio Frequency Network, now Patent No. 2,982,963. In that case a radio frequency network was provided for use as a diplexer unit in which aural and visual transmitter outputs could be combined for transmission over a single antenna, if desired, without introducing rapidly varying envelope phase delays. Such a network had a low loss and introduced negligible reflections while at the same time presenting substantially constant relative impedances to the transmitters over wide frequency range.

In the present invention by altering the circuitry of the network, disclosed in my copending case, substantially different and unusual results may be obtained which particularly adapt the network as a vestigial side band filter. One object of the present invention is to provide vestigial side band filter which may be designed to match an input transmission line over a wide band of frequencies so that reflections into the input transmission line will be minimized.

A further object of the present invention is to provide an improved vestigial side band filter which is particularly adapted to work over wide ranges of frequencies including the lower end of the V.H.F. range.

These and other objects of the present invention will be more clearly understood from a consideration of the drawings in connection with the specification set forth below, in which:

FIGURE 1 is a schematic diagram of the present invention.

FIGURE 2 is a graph used in connection with the explanation of the operation of the network, and, FIGURES 3, 4 and 5 are graphs used in connection with the operation of the network.

Referring to FIGURE 1, there is illustrated a network which may be connected to a source 1 of high frequency electro-magnetic energy. This source 1 is connected to the coaxial lines 2 and 3 through a matching junction 4 which should act as a two to one transformer so as to properly match the lines 2 and 3 to the coaxial line 5, lines 2, 3 and 5 all having the same characteristic impedance. All the lines, including lines 2 and 3, have relative lengths which form a portion of this invention as will hereinafter be explained in further detail. Line 2 is adapted to conduct the high frequency electro-magnetic energy derived from the source 1 to the portion of the network indicated at 7 through which it is transmitted to the section of the line 2*a*, which in turn is connected to one input of a hybrid 8. This unit or portion of the network 7 comprises two branches, one made up of line sections 16 and 17, with a resonant cavity 21 coupled in series with the line in such a manner that energy passing from line 16 to line 17 or vice versa will pass through the cavity 21, and the other branch made up of line sections 12 and 13 to which at junction 10 a resonant cavity 22 is coupled through a line section 18. Cavity 21 may be called the series cavity, while cavity 22 may be called the shunt cavity. Each of the two cavities may comprise a cylindrical polygon or other type of housing with a coxial or non-coaxial tube extending from one end of the housing to the other,forming inner conductors for the cavities. The two cavities are tuned to resonate at approximately the same frequency, for example, a frequency slightly below the visual carrier frequency of a television broadcast station. The two cavities 21 and 22 may be coupled to the transmission line sections 16, 17 and 18 by means of coupling loops such as 19, 20 and 23, which are extensions to the inner conductors of transmission lines which protrude into the cavity and are short circuited to the other conductors of said lines or by any other convenient method of coupling, whether capacitive or inductive. The electrical length of the transmission line section 18, together with the coupling loop 13, as a unit, is substantially one-quarter wavelength, or odd multiples thereof, at the resonant frequency of the cavities. Each of the branch lines 12 and 13 is one-quarter wave length or odd multiples thereof long, as measured between junctions 11 and 14 and between junctions 11 and 15 respectively at the resonant frequencies of the cavities. Transmission line sections 16 with a coupling loop 19 as well as a transmission line 17 with a coupling loop 20 are each collectively equivalent to one-quarter wavelength or odd multiples thereof at a resonant frequency of the cavities.

The coupling loops 19 and 20 in cavity 21 are oriented in such a manner that there is a 180° phase reversal at the resonance of the cavity, by virtue of the fact that one loop is grounded nearer the inner conductor of the cavity 21. The characteristic impedance of each of the arms is preferably equal to the impedance looking into line 2*a* which for example may be 51.5 oms.

This arrangement is close in nature to the details described in my copending application Serial No. 547,606, from which it will be noted that energies above and below resonance are transmitted through lines 12 and 13 with little energy being coupled from line section 16 to line section 17 through the cavity 21. At or near the resonant frequency of the cavity 21 and cavity 22, it was found that these frequencies are transmitted through the cavity 21 in their entirey except for the losses in the cavity itself.

By making the effective length of both branches as measured from junction 14 to the junction 15, equal in length and approximately $$\frac{\lambda}{2}$$

at resonant frequency and by proper orientation of the coupling loops 19 and 20 which cause a 180° phase reversal in the cavity, the network provides a means for reversing phase of energy at the resonant frequency while not reversing the phase at frequencies substantially above and below the resonant frequency.

When the degree of coupling to each cavity is properly adjusted, the network will have substantially constant impedance even in the transition region between the resonant frequency of the cavities and frequencies substantially above and below resonance. The output phase will vary smoothly from 0° to 90°, to 180° to 270°–360°, in a manner similar to curve A in FIGURE 2.

There will be a frequency below and above the resonant frequency where one-half of the energy will be transmitted through the branch with the series cavity 21 and one-half will be transmitted through the branch with the shunt cavity 22. At these frequencies, the output in a matched line will be phase shifted substantially 90° and 270° respectively. This phase shift is understood to be in addition to the normal phase shift that would occur in a uniform transmission line of equivalent electrical length.

For purposes of this description, the band of frequencies between the 90° and 270° phase shift frequencies will be called the "Rapid-Phase-Shift-Band" and denoted by the symbol $\Delta f_{RPS}$.

The output of the portion 7 of the network is connected through the line 2*a* to the hybrid 8. This hybrid, may, for example, be of the same type as described in U.S. patent application Serial No. 175,694. In this hybrid, four terminals are provided as indicated at I, II, P and S. Terminal II is connected to the other end of the coaxial line 3, while terminal P may be connected through a diplexer 30 by means of the coaxial line 31 to the antenna 32. Terminal S is connected to a dummy load 33. The nature of this hybrid is such that signals which are of the same phase at side terminals I and II will be transmitted to the antenna through the diplexer connected to the parallel feed terminal P, while signals that are out of phase at terminals I and II will be transmitted to the dummy load at the series feed terminal S. Moreover, at different phase relations, between in-phase and out-of-phase of the input signals at terminals I and II, variations in the relative amounts of power transmitted to terminals P and S may be obtained. The various phase relations may be graphically plotted against frequency. Such a graph is illustrated in FIGURE 2. The dotted curves are drawn such that relative phase delays between energy at terminal I and energy at terminal II in excess of 360° caused by the difference L in effective electrical pathlength between the path from junction 4 to terminal I and the path from junction 4 to terminal II are plotted as the amount that they exceed, $n\times 360°$, where $n$ is the largest whole number of wave lengths in the pathlengths difference L. It is thus possible to select the slope and position of the dotted curve over a selected useful range.

The location and shape of the dotted curve varies in some degree with the application of the filter as may be seen from the following examples. In general the pathlength difference L is substantially an odd multiple of quarter wave lengths at the resonant frequency $f_r$.

The output at terminals P and S of the hybrid as a function of uniform signals at side terminals I and II of relative phase $\theta$ will vary as shown in FIGURE 3.

In addition for vestigial side band filter application, it has been found that pathlength differences L lying between the limits given by the following equation $$\frac{1}{6}\frac{v}{\Delta f_{RPS}} > L > \frac{1}{30}\frac{v}{\Delta f_{RPS}}$$

where $v$=velocity of propagation are particularly useful.

Structures with parameters outside of these limits may still be useful in some applications, but when used as a vestigial side band filter would have more than a desirable degree of loss, in the transmission band and/or less than a desirable degree of rejection in the rejection band.

In FIG. 2, the solid curve is a graph of the phase relation of the signals at terminal II with respect to the phase of the signal at terminal I that occurs when the electrically equivalent length of the line 3 is equal to the "effective uniform transmission line length" of the connection between the transformer 4 and terminal II. This "effective uniform transmission line length" is the electrically equivalent length of the paths through the lines 2, 2*a* and the unit 7 if the loops in the series cavity had been oriented to give in-phase rather than 180° out-of-phase transmission at the resonant frequency.

If the transmission line is increased in equivalent electrical length by amount L, there will be an additional phase delay at side terminal I which will vary in a manner set forth for example by either of the dotted lines in FIGURE 2. The ordinate difference between the solid curve and the dotted curve then represents the relative phase relation between the signals at I and II with this additional line L added in line 3.

From the preceding description it will be recognized that the path from line 5 to side terminal I and the path from line 5 to side terminal II pass spectral components within the band without altering the relative amplitude of the components, that is, each path transmits energy with substantially frequency insensitive attenuation. Meanwhile energy traveling over the first-mentioned path exhibits a sudden 180° phase change, e.g. phase reversal, with respect to energy traveling over the second path as a function of frequency in a very narrow portion of the frequency spectrum embracing the prescribed frequency corresponding essentially to the resonant frequency of the cavities. That is, if energy at a frequency just below resonance arrives at terminals I and II in phase, energy at a frequency just above resonance arrives at terminals I and II in relatve phase opposition. And the difference in pathlengths is chosen so that energy at a frequency near said prescribed frequency arrives at terminal I in either phase coincidence or phase opposition with respect to energy arriving at side terminal II. That is, zero crossovers of such energy are in substantial time coincidence at terminals I and II.

The transfer characteristics graphically depicted in FIGURE 3 may be determined by the formulae:

$$\left|\frac{E\ \text{out}_p}{E\ \text{in}}\right| = \left|\cos\frac{(\theta_I-\theta_{II})}{2}\right|$$

and $$\left|\frac{E\ \text{out}_S}{E\ \text{in}}\right| = \left|\sin\frac{(\theta_I-\theta_{II})}{2} = \right|\cos\frac{(\theta_I-\theta_{II}\pm 180°)}{2}\right|$$

Actual values of output may be somewhat lower due to losses in the network.

Thus by making line 3 longer than the other path between the transformer 4 and terminal II, an effective control over the transmission of power over a band width may be obtained. Thus, when a six megacycle band width of V.H.F. is utilized, for example, for television transmission, the vestigial side band may be effectively filtered. However the slope of $$\frac{e\ \text{out}}{e\ \text{in}}$$

as plotted against the carrier frequency is precisely maintained particularly at the more critical lower end of the carrier frequency. In addition to effective filtering effected by proper design of frequencies above and below the carrier frequency, the characteristic impedance of the filter network is maintained constant over the rejected region as well as over the pass band region of the frequency spectrum and also proper matching to the input transmitting line may be obtained.

In addition, this unit provides a relatively uniform phase change between the output of the hybrid and the transmitter output over the entire transmitted frequency band width, which in turn minimizes the phase distortion which would otherwise be introduced into the transmitted frequency band.

A vestigial side band filter has been constructed in this manner to operate at V.H.F. television Channel 3.

This network comprises a circuit as shown in FIGURE 1, with a "matched-series-shunt cavity" network unit 7 of the following properties.

Resonant frequency, $f_r$=60.7 mc./s.
$\Delta f_{RPS}$=1 mc.
Reject band=3.25 mc./sec.
Pass band=5.75 mc./sec.
$L=2.7\ \lambda_r$ FIGURE 4 shows the overall transfer characteristic into the output at P as a function of deviation from the visual carrier frequency of 61.250 mc./sec. The following comments may be made in regards to the characteristics.

(1) The transmission band has been made wider than the reject band.

(2) In the reject band all frequencies are attenuated by at least 20 db. In addition two specific frequency regions have been attenuated at least 30 db. These frequencies have been chosen to be −3.58 mc., the image of the color sub-carrier and −1.5 mc., the aural carrier of Channel 2.

(3) In the pass band at the visual carrier frequency, little power is absorbed in the dummy load by selecting the voltages at I and II to be substantially in-phase at the carrier frequency.

(4) Insertion loss at the carrier frequency is due primarily to ohmic losses in the cavities and in the cable used as line 3. This cable may for instance be an RG–17/u cable.

(5) Voltage variation in pass band does not exceed ±3 db.

(6) Shape of transition region is controlled by the selection of parameters. The filter characteristics are easy to compute. The circuit is easy to construct and adjust. FIGURE 5 shows the transfer characteristic of a calculated filter with slightly different characteristics.

Visual carrier frequency=55.25 mc./sec.
$\Delta f_{RPS}$=.9 mc./sec.
$f_r$=−.775 mc./sec.
$L$=3.73 $\lambda_r$.

Having now described my invention, I claim:

1. Frequency selective apparatus comprising, an input energy receiving junction, a hybrid junction having a series feed input, a parallel feed input and a pair of side terminals, first means defining a first path for transmitting energy from said input energy receiving junction to one of said side terminals with frequency insensitive attenuation, and second means defining a second path for transmitting energy from said input energy receiving junction to the other of said side terminals with frequency insensitive attenuation while effecting a sudden phase reversal as a function of frequency only within a narrow spectrum about a prescribed frequency, the difference in effective electrical length between said first and second paths establishing substantial time coincidence between zero crossovers of energy of a frequency near said prescribed frequency at said side terminals when transmitted over said paths, said difference being at least three quarter wavelength at said prescribed frequency and substantially an odd multiple of quarter wavelength at said prescribed frequency.

2. Frequency selective apparatus in accordance with claim 1 and further comprising, means for withdrawing energy from said series feed input and from said parallel feed input.

3. Frequency selective apparatus in accordance with claim 1 wherein the frequency insensitive attenuation in said first and second paths is substantially equal.

4. Frequency selective apparatus in accordance with claim 1 wherein said second means comprises, an input junction, an output junction, a resonant cavity having a pair of coupling means for exchanging energy with external devices and presenting a very low impedance between said coupling means at said prescribed frequency, input and output wave transmission conduits respectively connected from said input and output junctions to respective ones of said coupling means to effect a phase reversal for energy transmitted through said cavity of said prescribed frequency, the electrical length of said conduits being selected so that the effective impedance of said cavity referred to said junctions is much higher than the characteristic impedance of said conduits at frequencies outside the spectrum centered about said prescribed frequency, a third wave transmission conduit having said characteristic impedance connected between said input and output junctions, and another cavity resonant at said prescribed frequency coupled to said third wave transmission conduit at a point such that the effective impedance of said another cavity referred to said junctions at said prescribed resonant frequency is much higher than said characteristic impedance, a fourth wave transmission conduit having said characteristic impedance connected between said input energy receiving junction and said input junction, and a fifth wave transmission conduit having said characteristic impedance connected between said output junction and said other side terminal; said first means comprising a sixth wave transmission conduit having said characteristic impedance connected between said input energy receiving junction and said one side terminal.

References Cited in the file of this patent

UNITED STATES PATENTS

| | | |
|---|---|---|
| 2,649,576 | Lewis | Aug. 18, 1953 |
| 2,728,050 | Van De Lindt | Dec. 20, 1955 |
| 2,916,712 | Artuso | Dec. 8, 1959 |

FOREIGN PATENTS

| | | |
|---|---|---|
| 495,262 | Canada | Aug. 11, 1953 |